US007753398B2

(12) United States Patent
Yang

(10) Patent No.: US 7,753,398 B2
(45) Date of Patent: Jul. 13, 2010

(54) BABY STROLLER FRAME WITH SEAT DIRECTION CHANGING MECHANISM

(75) Inventor: Cheng-Fan Yang, Tainen Hsien (TW)

(73) Assignee: Link Treasure Limited, Tortola (VG)

( * ) Notice: Subject to any disclaimer, the term of this patent is extended or adjusted under 35 U.S.C. 154(b) by 301 days.

(21) Appl. No.: 12/111,495

(22) Filed: Apr. 29, 2008

(65) Prior Publication Data

US 2008/0231023 A1    Sep. 25, 2008

Related U.S. Application Data

(63) Continuation-in-part of application No. 11/509,704, filed on Aug. 25, 2006, now Pat. No. 7,367,581.

(51) Int. Cl.
*B62B 1/00* (2006.01)

(52) U.S. Cl. ............... 280/642; 280/647; 280/658

(58) Field of Classification Search ............ 280/642, 280/647, 658, 650, 657, 648, 47.38; 297/423.36, 297/284.8, 423.24, 321
See application file for complete search history.

(56) References Cited

U.S. PATENT DOCUMENTS 6,513,827 B1 * 2/2003 Barenbrug ............ 280/648

| 7,032,922 | B1 * | 4/2006 | Lan ............ 280/648 |
| 7,367,581 | B2 * | 5/2008 | Yang ........... 280/642 |
| 7,377,537 | B2 * | 5/2008 | Li ............. 280/650 |
| 7,426,970 | B2 * | 9/2008 | Olsen .......... 280/647 |
| 7,694,996 | B2 * | 4/2010 | Saville et al. .... 280/642 |
| 2007/0001429 | A1 * | 1/2007 | Maciejczyk ...... 280/642 |

* cited by examiner

*Primary Examiner*—Hau V Phan
(74) *Attorney, Agent, or Firm*—Morris, Manning & Martin LLP; Tim Tingkang Xia

(57) ABSTRACT

A baby stroller comprises a collapsible wheeled frame, a swivelable seat, and a swivelable connector connected between the collapsible wheeled frame and the swivelable seat. The swivelable connector is pivotally connected atop the collapsible wheeled frame and has a locking mechanism for fixing the swivelable connector in a plurality of predetermined directions. The swivelable seat has a pair of push bars connected to both sides thereof through a pair of lockable swivel base, wherein the lockable swivel base can be used to lock the push bars either forwardly or backwardly and comprises a driving mechanism for unlocking the locking mechanism so as to permit the swivelable connector to rotate relative to the collapsible wheeled frame 1 thereby to change the direction of the swivelable seat.

17 Claims, 13 Drawing Sheets

BABY STROLLER FRAME WITH SEAT DIRECTION CHANGING MECHANISM

CROSS REFERENCE TO RELATED APPLICATIONS

This invention is a continuation-in-part of U.S. Ser. No. 11/509,704, filed Aug. 25, 2006, entitled "BABY STROLLER FRAME WITH SEAT DIRECTION CHANGING MECHANISM". The disclosure of the above identified co-pending application is incorporated herein by reference in its entirety.

FIELD OF THE INVENTION

The present invention relates to a baby stroller frame with a swivelable seat, and more particularly, to a baby stroller frame which can be operative to change the seat direction thereof by rotating a pair of push bars connected on either sides of the seat, and the push bars can be restored to the rear wheels side for pushing baby stroller.

DESCRIPTION OF THE RELATED ART

Baby stroller is provided for baby or small children that can be pushed by a care giver for traveling forwardly together. Normally, the seat and handle bar of traditional baby stroller are fixed in a non-changeable direction, that makes a baby can only sit and face forwardly, even though she is being crying and becoming needed to see and talk with the care giver just behind her.

To comfort a crying baby in the above mentioned situation, an example solution has shown in U.S. Pat. No. 5,845,924 (Huang). Huang's stroller has a handle bar pivotally connected to a baby stroller frame for rotating to change and fix the direction in a new direction thereof either forwardly or backwardly. By changing the direction of the handle bar, the baby can sit inside the stroller either facing forwardly or backwardly, so as can face and see the care giver backwardly whenever she needs.

Although Huang's stroller has provided the good idea and convenience for care givers to change the handle bar direction for comforting a crying baby without having to stop and see, an inconvenience is still arisen while the user is needed to change the handle bars direction in a narrow or tiny space; for instance, to operate the rotation of the handle bar in a crowded elevator. Further, when the handle bar is rotated and fixed at the front wheel side would cause a difficult steering, because an ordinary rear wheel sets are direction-fixed, and the front wheel sets are normally be swivelable for easy steering and making to turn around.

In U.S. Ser. No. 11/509,704, the inventor provides a mechanism that permits care givers to change the seat direction without changing the handle bar direction so as to solve the difficulty of steering problem as forementioned. For providing more convenience, the inventor is further intended to provide a baby stroller frame with a detachable swivelable seat, wherein the swivelable seat has a pair of push bars for changing the direction thereof or carrying the baby seat alone.

SUMMARY OF THE INVENTION

In order to fulfill the above object, the present invention provides a baby stroller frame with a swivelable seat. The user can change the swivelable seat direction by rotating the push bar to an upright position and thereafter to fix the handle bar to the rear wheel side, so as to accommodate the baby sitting and facing the care giver and this would also permit the care giver to steer the baby stroller normally.

One embodiment of the baby stroller according to the present invention may comprise a collapsible wheeled frame, a swivelable seat, and a swivelable connector connected between the collapsible wheeled frame and the swivelable seat. The swivelable connector is pivotally connected atop the collapsible wheeled frame and has a locking mechanism for releasably locking the swivelable connector in a plurality of predetermined directions.

The swivelable seat has a pair of push bars connected to the sides thereof through a pair of lockable swivel base, wherein the lockable swivel base can be used to lock and unlock the push bars that permits the push bars to be fixed either forwardly or backwardly. The swivelable seat may further comprise a driving mechanism driven by the push bars for unlocking the locking mechanism so as to permit the swivelable connector to be rotatable relative to the collapsible wheeled frame thereby to change the direction of the swivelable seat.

Additional objects and advantages of the invention will be set forth in the following description and it is easy for a person having ordinary skill in this art to infer other variations from above illustrations and embodiments. It is to be understood that both the foregoing general description and the following detailed description are exemplary and explanatory only and are not restrictive of the invention, as claimed.

DETAILED DESCRIPTION OF THE PREFERRED EMBODIMENTS

Figure 1:
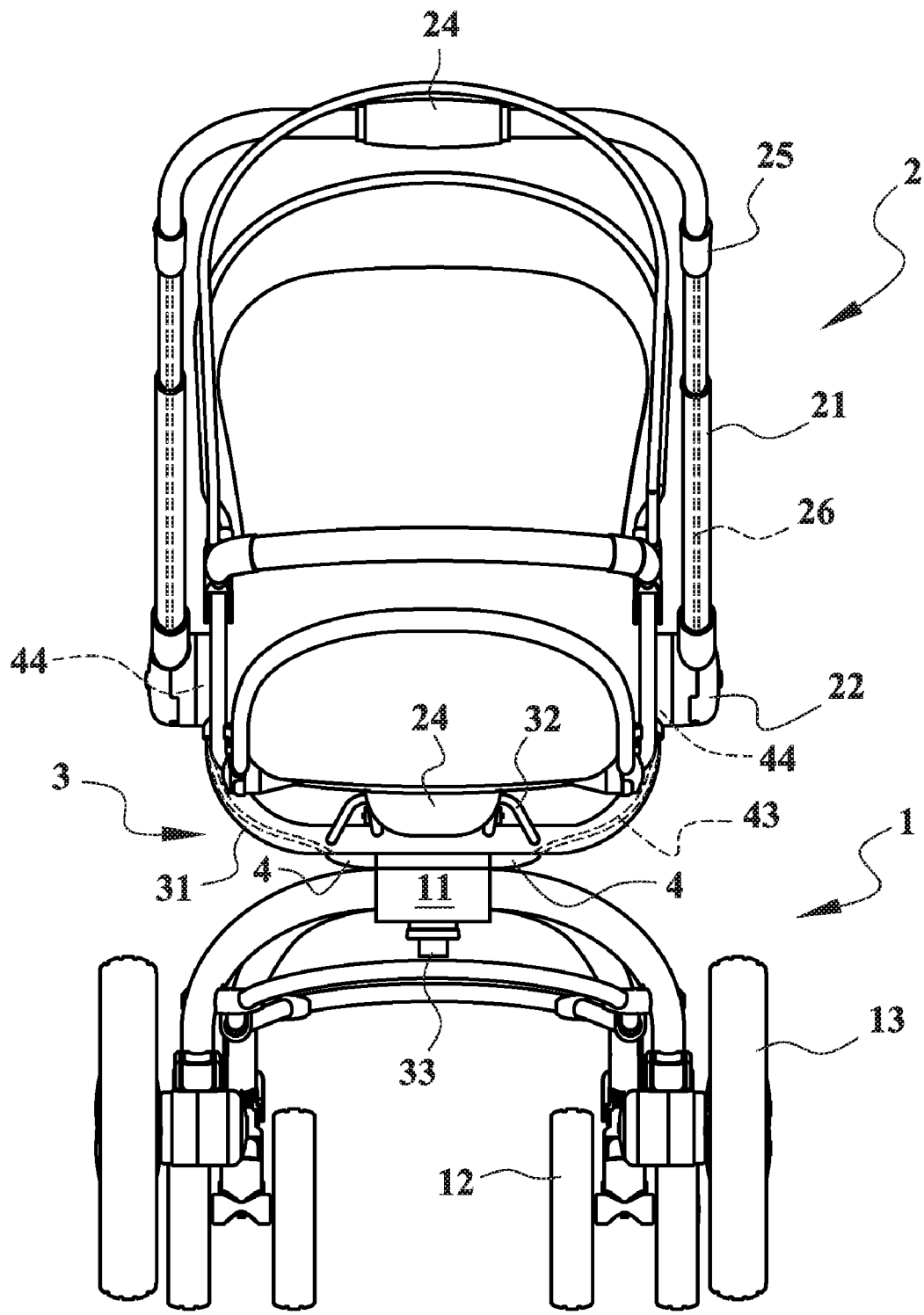
FIG. 1 is an elevation front view schematically illustrating a baby stroller frame embodiment according to the present invention.
Figure 2:
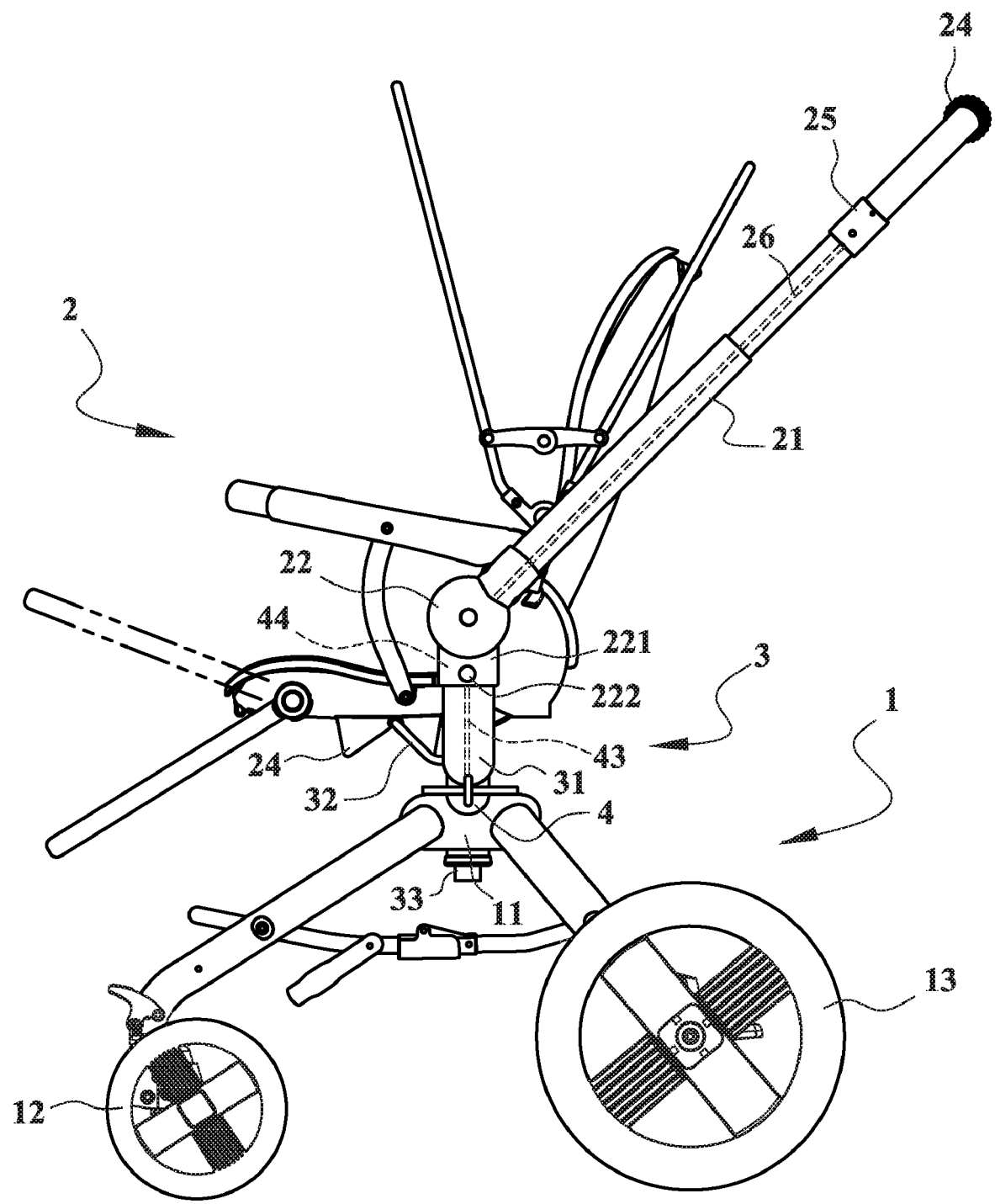
FIG. 2 is an elevation side view schematically illustrating the baby stroller frame of FIG. 1.

With referring to FIGS. 1 and 2, an embodiment of a baby stroller frame according to the present invention comprises a collapsible wheeled frame 1, a swivelable seat 2, and a swivelable connector 3.

The swivelable connector 3 is connected between the collapsible wheeled frame 1 and the swivelable seat 2 and pivotally connected atop the collapsible wheeled frame 1 and comprises at least a locking mechanism 4 for fixing the swivelable connector 3 in a plurality of predetermined directions.

The swivelable connector 3 is swively mounted atop the swiveling mount 11 and comprises a locking mechanism 4 for releasably engaging with the locking position 110, so as to lock the swivelable connector 3 in a fixed direction.

The collapsible wheeled frame 1 comprises at least a swiveling mount 11, at least a front wheel 12 and a pair of rear wheels 13. The front wheel 12 may have a castoring axle for facilitating the steering to turn around, and the rear wheels 13 may have a brake mechanism for braking and preventing the stroller from unwanted moving.

Figure 3:
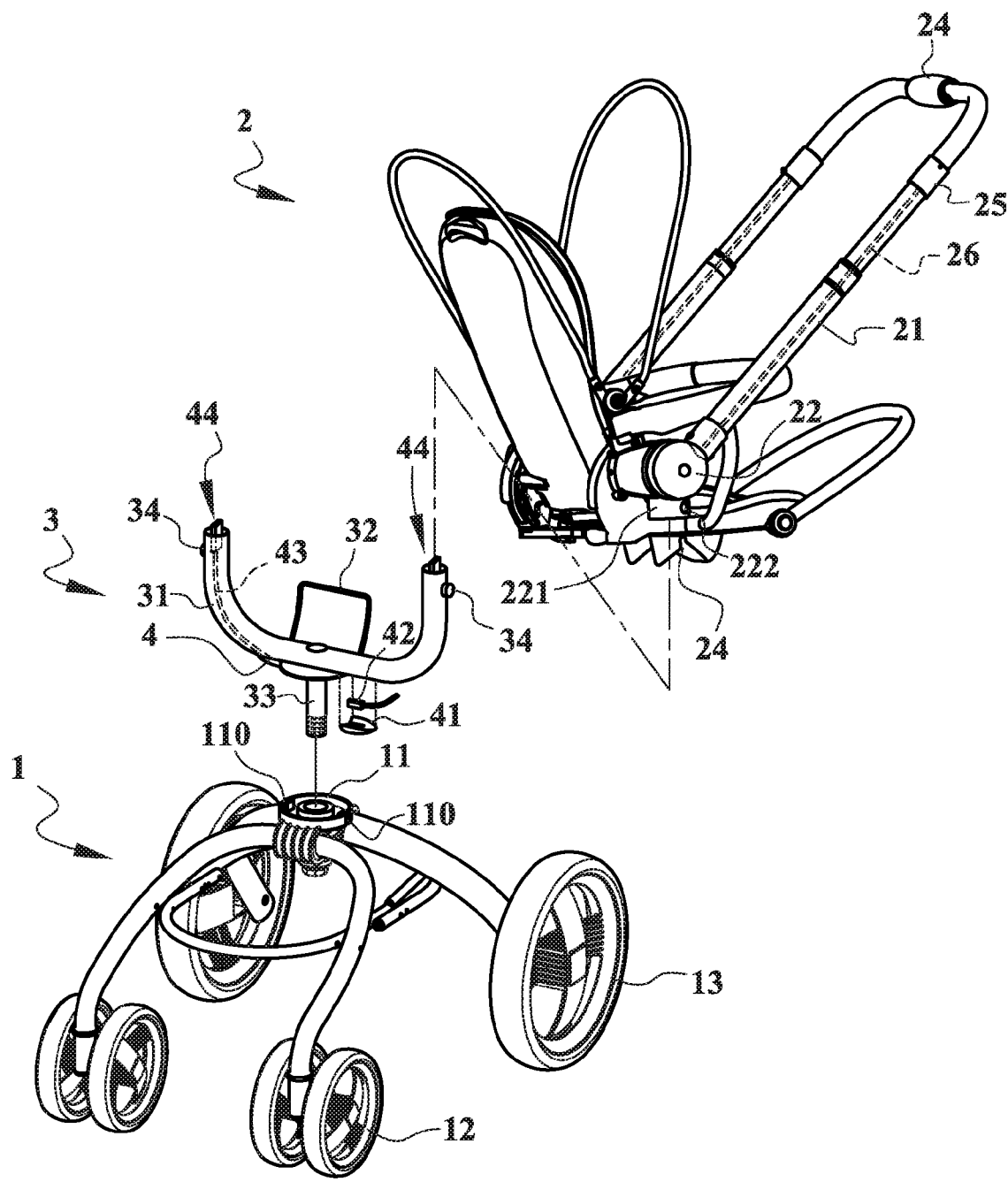
FIG. 3 is an exploded perspective view schematically illustrating the baby stroller frame of FIG. 1.
Figure 4:
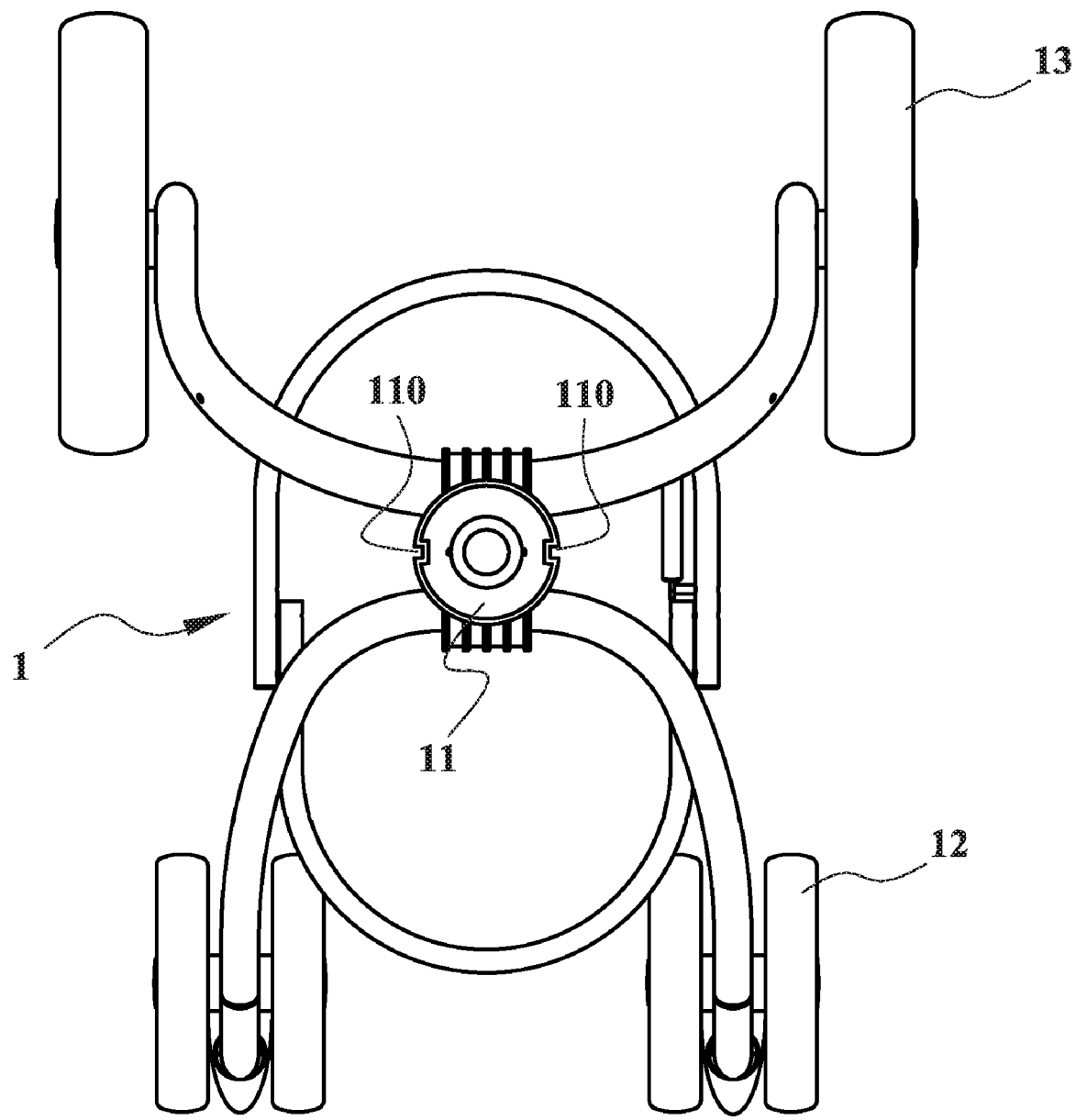
FIG. 4 is a top view of the collapsible wheeled frame of the baby stroller frame according to the present invention.
Figure 5:
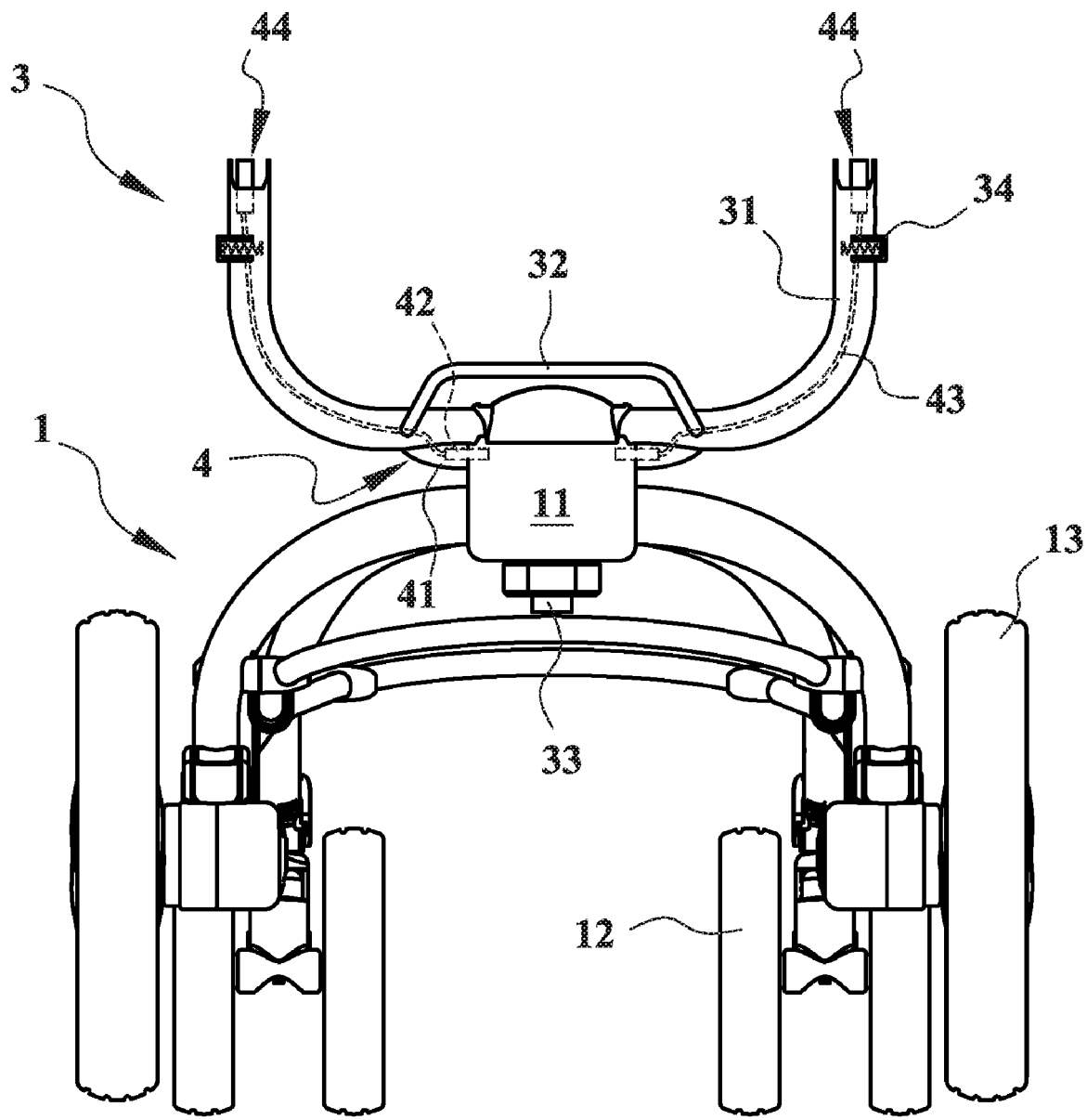
FIG. 5 is a front elevation view illustrating the collapsible wheeled frame of FIG. 4 pivotally connected with the swivelable connector according to the present invention.

Referring to FIGS. 3 to 5, the swiveling mount 11 comprises more than two locking positions 110 for engaging with the locking mechanism 4 so as to lock the swivelable connector 3 and the swivelable seat 2 in more than two predetermined directions.

Preferably, the swiveling mount 11 may be formed with a pair of locking positions 110 apart from each other with 180° so as to engage with locking mechanism 4, thereby to lock the swivelable seat 2 in either a forward or backward direction. A person who skilled in the art, may know that the locking positions 110 can also be formed with more than two positions, and the locking positions 110 can be apart from each other less than 180°; for instance, 90°, for adding more choices for setting the direction of the swivelable seat 2 for fun.

The locking mechanism 4 may comprise at least a sliding guider 41, a spring-biased latch 42 and a second connecting member 43. The spring-biased latch 42 is slidably received in the sliding guider 41, and has a locked position to engage in one of the locking positions 110 and an unlocked position to disengaged from the locking position 1 10. A spring (not shown) is used to bias the spring-biased latch 42 toward the locked position. The second connecting member 43 has one end connected with the spring-biased latch 42, and another end connected with the driving mechanism 44. When the driving mechanism 44 is actuated, the second connecting member 43 pulls the spring-biased latch 42 from the locked position to the unlocked position thereby to unlock the locking mechanism 4 and thereby to permit the swivelable seat to rotate and change its direction.

The swivelable seat 2 has a pair of push bars 21 connected to both sides thereof through a pair of lockable swivel base 22, wherein the lockable swivel base 22 can be used to lock the push bars 21 into either a forward position or backward position. A handle for gripping by hand is connected between the pair of push bars 21. The push bars 21 each comprises a releasing mechanism 25 and first connecting member 26 which associates between the releasing mechanism 25 and the lockable swivel base 22. The releasing mechanism 25 may be a spring biased element slidably mounted on the push bars 21 for pulling the first connecting member 26 to unlock the lockable swivel base 22 thereby to permit the push bars 21 to rotate into an upright position and actuate the driving mechanism 44, so as to unlock the locking mechanism 4 from the swiveling mount 11 to rotate and change the swivelable seat direction.

Referring to FIGS. 6-11, the driving mechanism 44 is actuated by the lockable swivel base 22; for instance, the lockable swivel base 22 may comprise a cam member 23 slidably abutted against the driving mechanism 44 in an actuated position and a non-actuated position. When the push bars 21 is locked in either forward or rearward position, the cam member is kept in the non-actuated position; and when the push bars 21 is unlocked and rotated to the upright position, the cam member 23 is rotated to drive the driving mechanism 44 to the actuated position, thereby to pull the second connecting member 43 and unlock the locking mechanism 4, so as to permit the swivelable connector 3 to rotate relative to the collapsible wheeled frame 1 and change the direction of the swivelable seat 2.

Referring again to FIG. 6, it would be appreciated by one skilled in the art that the swivelable connector 3 can further to comprise a first support member 31, a second support member 32 and an axle 33. The first support member 31 is formed with a pair of arms for operatively receiving the driving mechanism 44 therein. The second support member 32 is connected between the driving mechanism 44 and the locking mechanism 4. The axle 33 is downwardly extending for swivelably received in the swiveling mount 11.

Preferable, each arm of the first support member 31 may further comprise a spring biased button 34 for releasably engaging with the swivelable seat 2, and the swivelable seat 2 comprises a pair of receptacle 221 each formed with a hole 222 for engaging with the spring biased button 34. Further, the swivelable seat 2 can be formed with a snap-in holder for holding the second support member 32, so as to enhance the stability of the swivelable seat 2 while in use.

Figure 6:
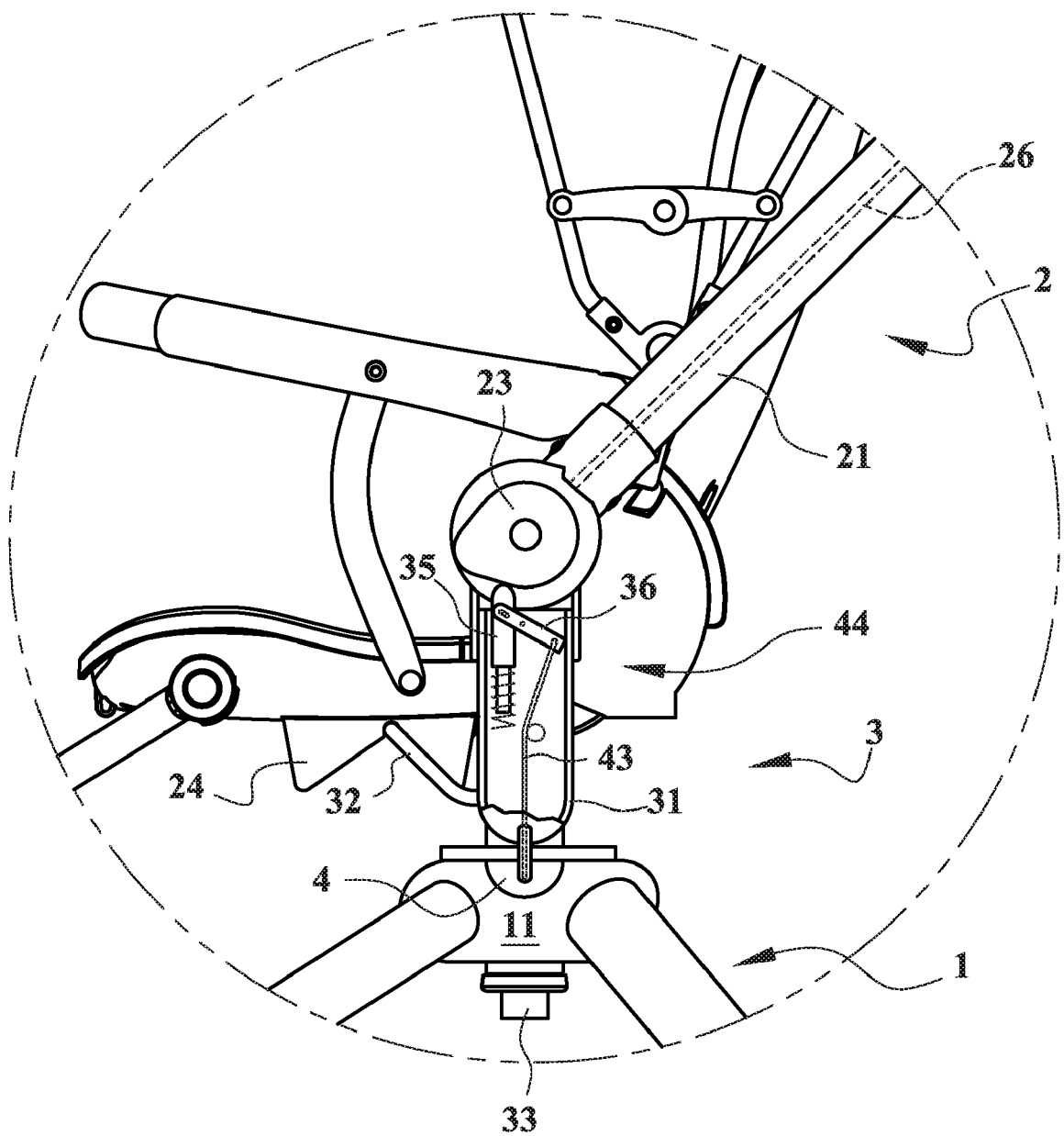
FIG. 6 is an illustrative partial enlarged view illustrating a driving mechanism and a locking mechanism of an embodiment according to the present invention being associated with each other in a locked position.
Figure 7:
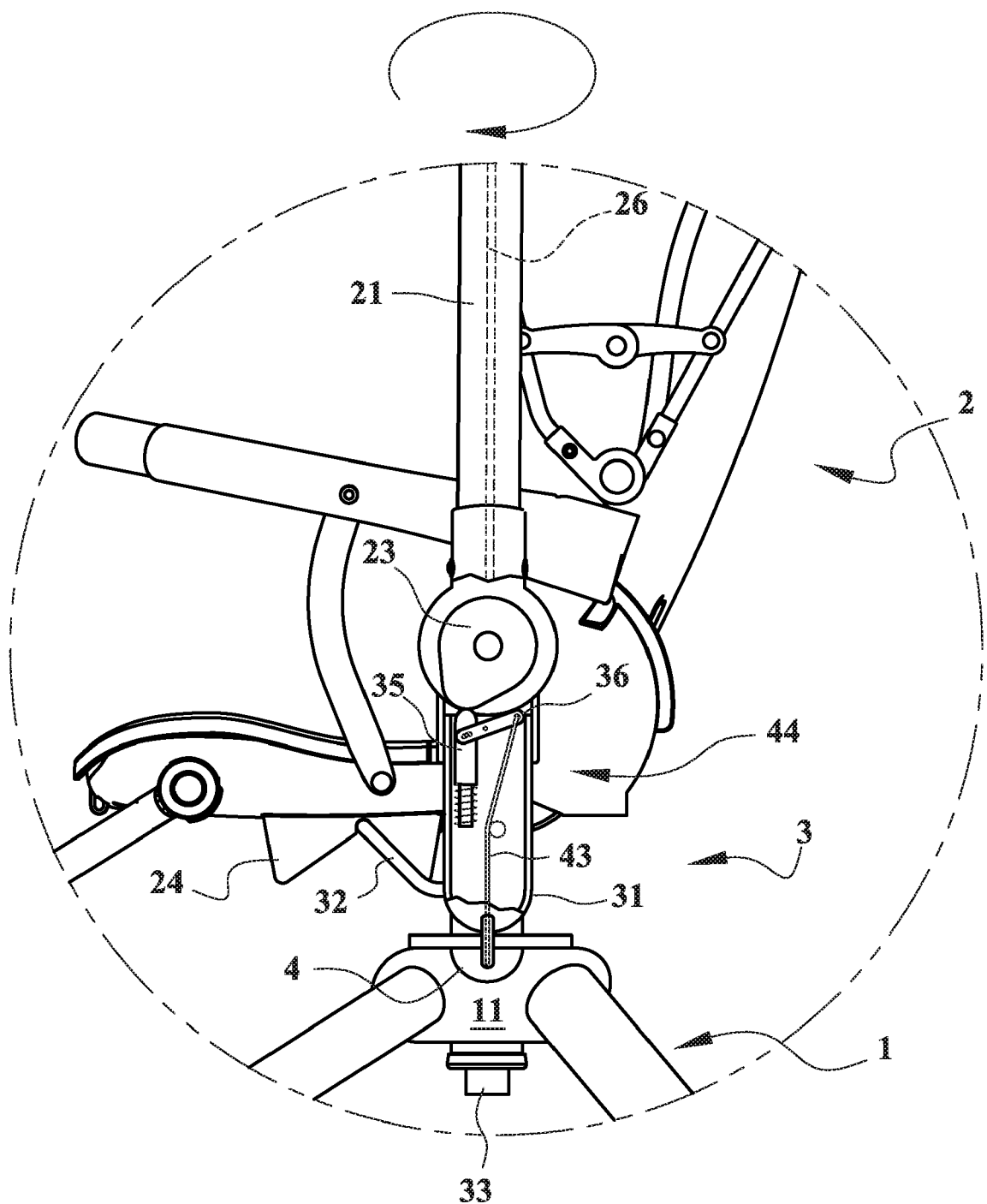
FIG. 7 is an illustrative partial enlarged view illustrating the driving mechanism and locking mechanism of FIG. 6 being associated with each other in an unlocked position.

Referring to FIGS. 6 and 7, an embodiment of the driving mechanism 44 includes a spring biased slider 35 and a lever 36. The lever 36 is pivoted in the upper end of the swivel connector 3, and has one end connected with the spring biased slider 35, another end connected with the second connecting member 43. The spring biased slider 35 is slidably abutted against the cam member 23 for driving the lever 36 to rotate and pulling the second connecting member 43 to unlock the locking mechanism 4.

Figure 8:
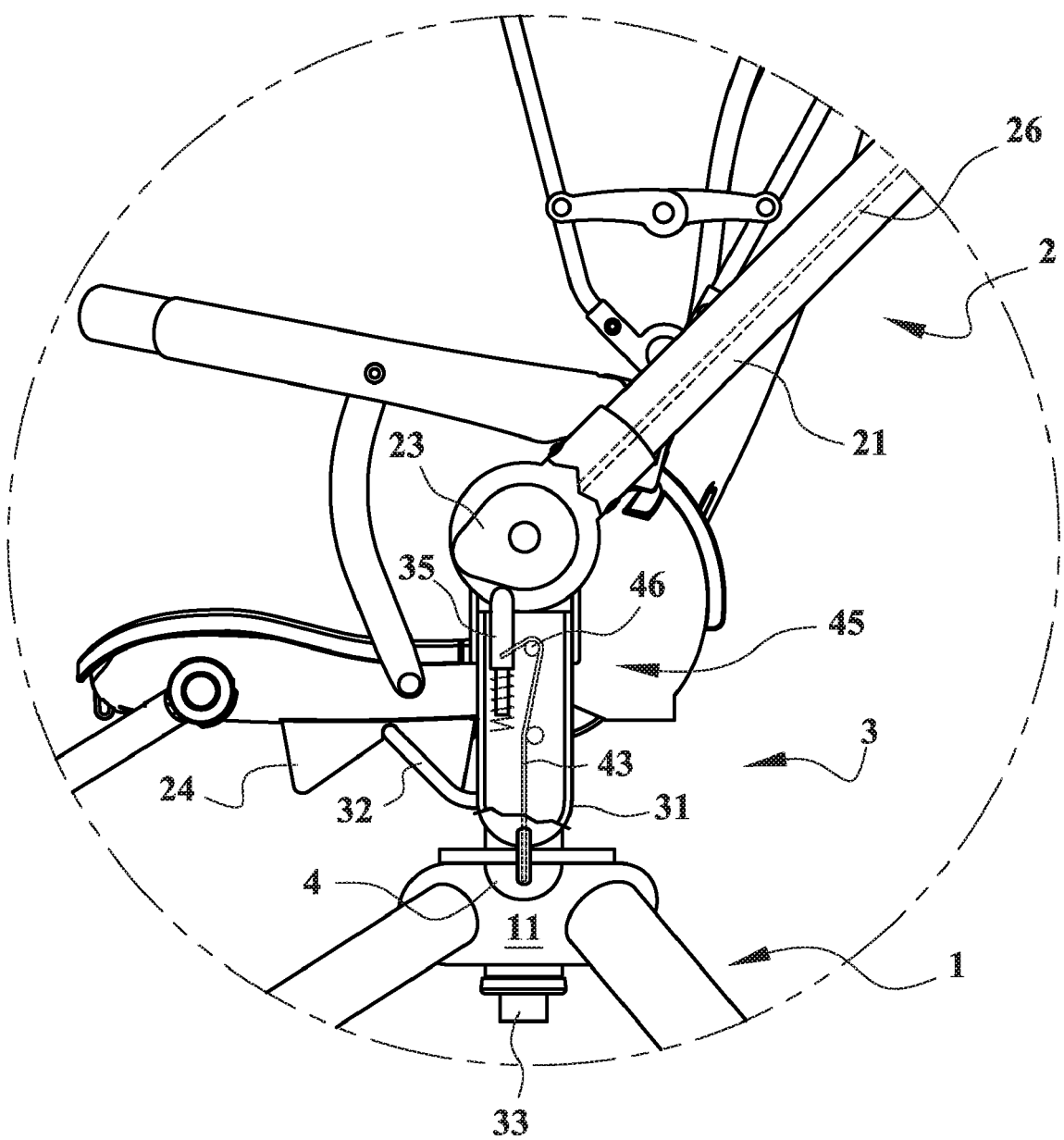
FIG. 8 is an illustrative partial enlarged view illustrating a driving mechanism and a locking mechanism of another embodiment according to the present invention being associated with each other in a locked position.
Figure 9:
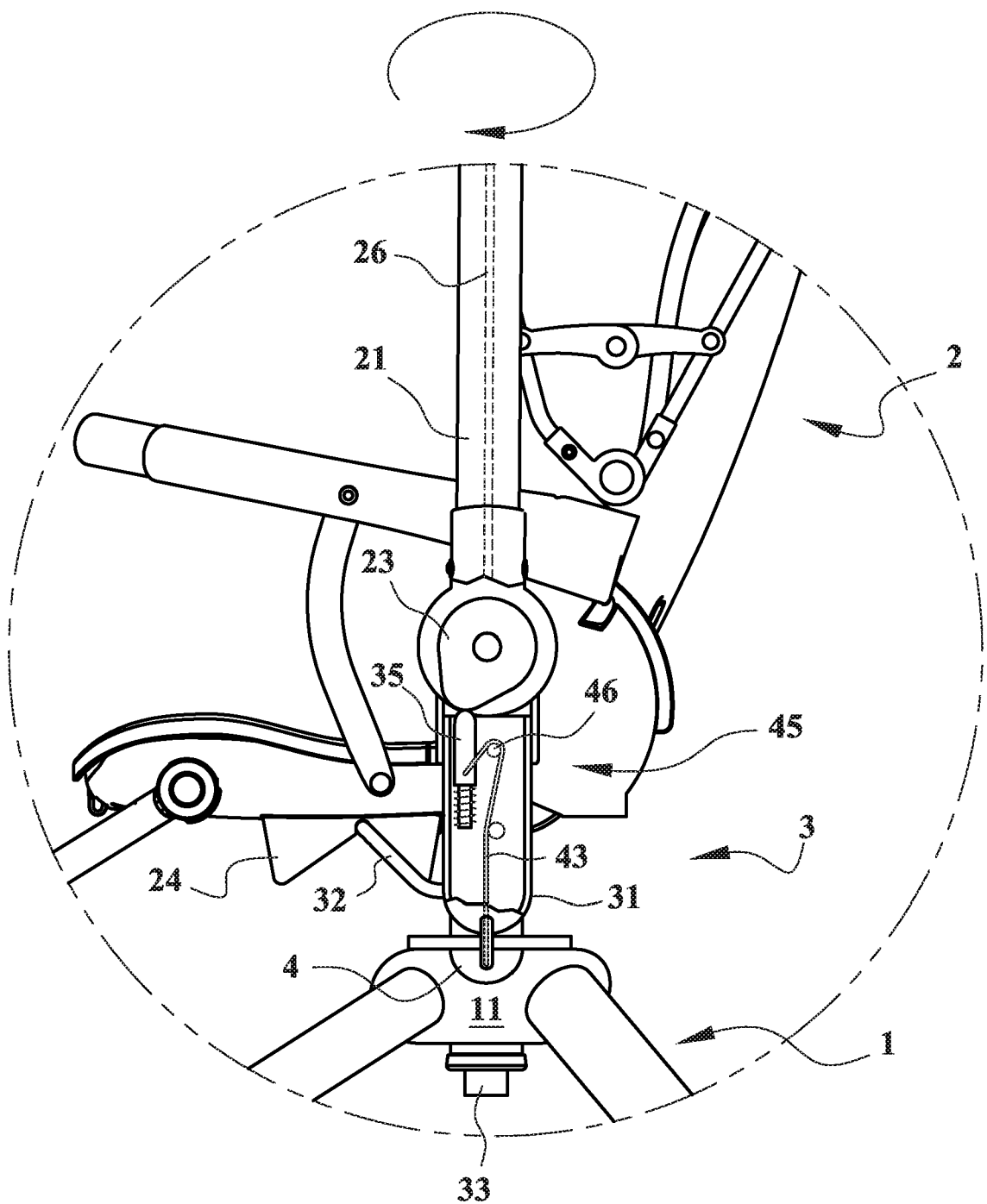
FIG. 9 is an illustrative partial enlarged view illustrating the driving mechanism and locking mechanism of FIG. 8 being associated with each other in an unlocked position.

Referring to FIGS. 8 and 9, an alternative embodiment of driving mechanism 45 may include a spring biased slider 35 and a pulley 46. The second connecting member 43 may be a wire or cable guided by the pulley 46. The spring biased slider 35 is slidably abutted against the cam member 23 for pulling the second connecting member 43 to unlock the locking mechanism 4.

Figure 10:
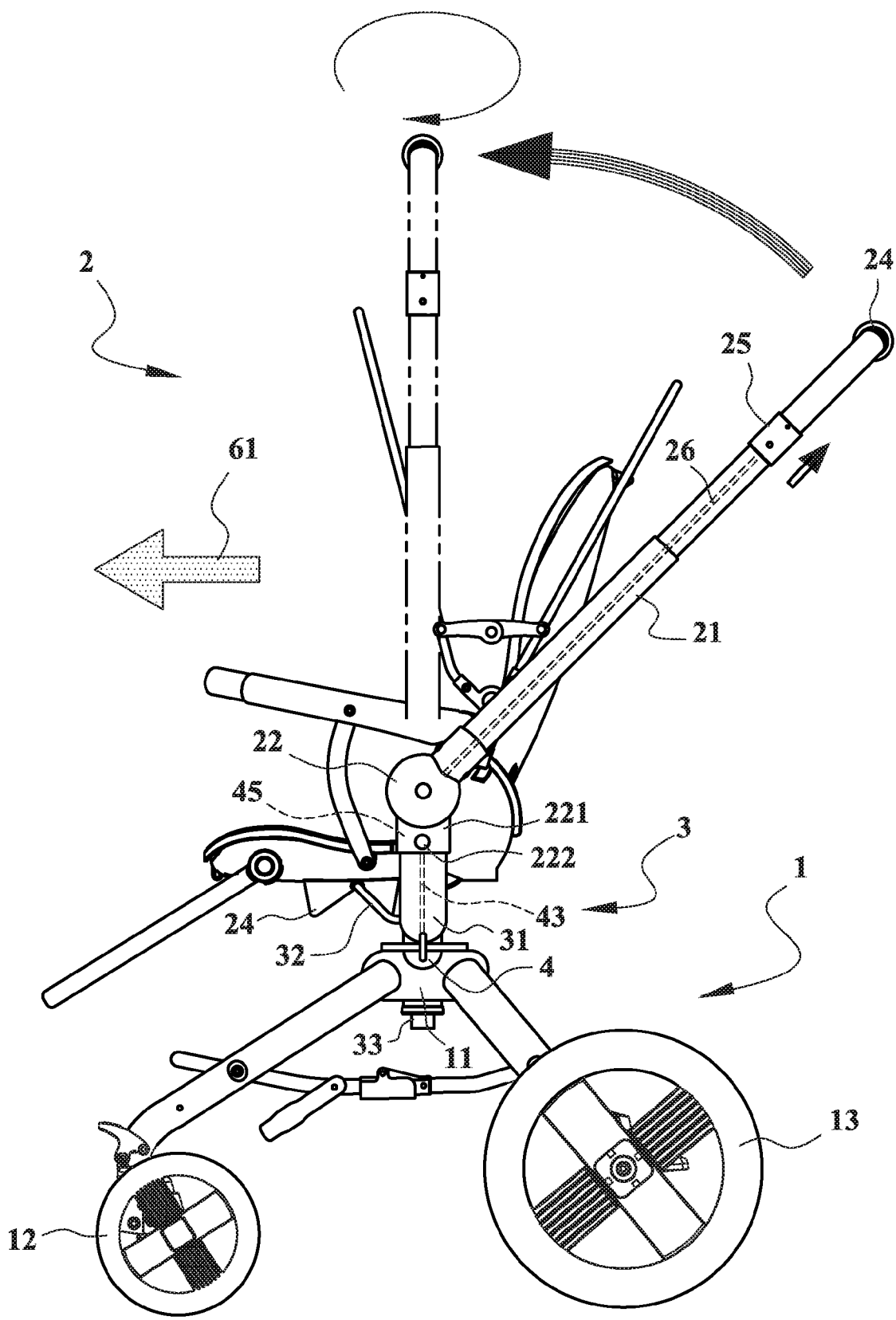
FIG. 10 is an illustrative side view illustrating a handle bar to be rotated from a rearward position to an upward position to unlock the locking mechanism, so as to permit the swivelable seat freely to rotate or change its direction.
Figure 11:
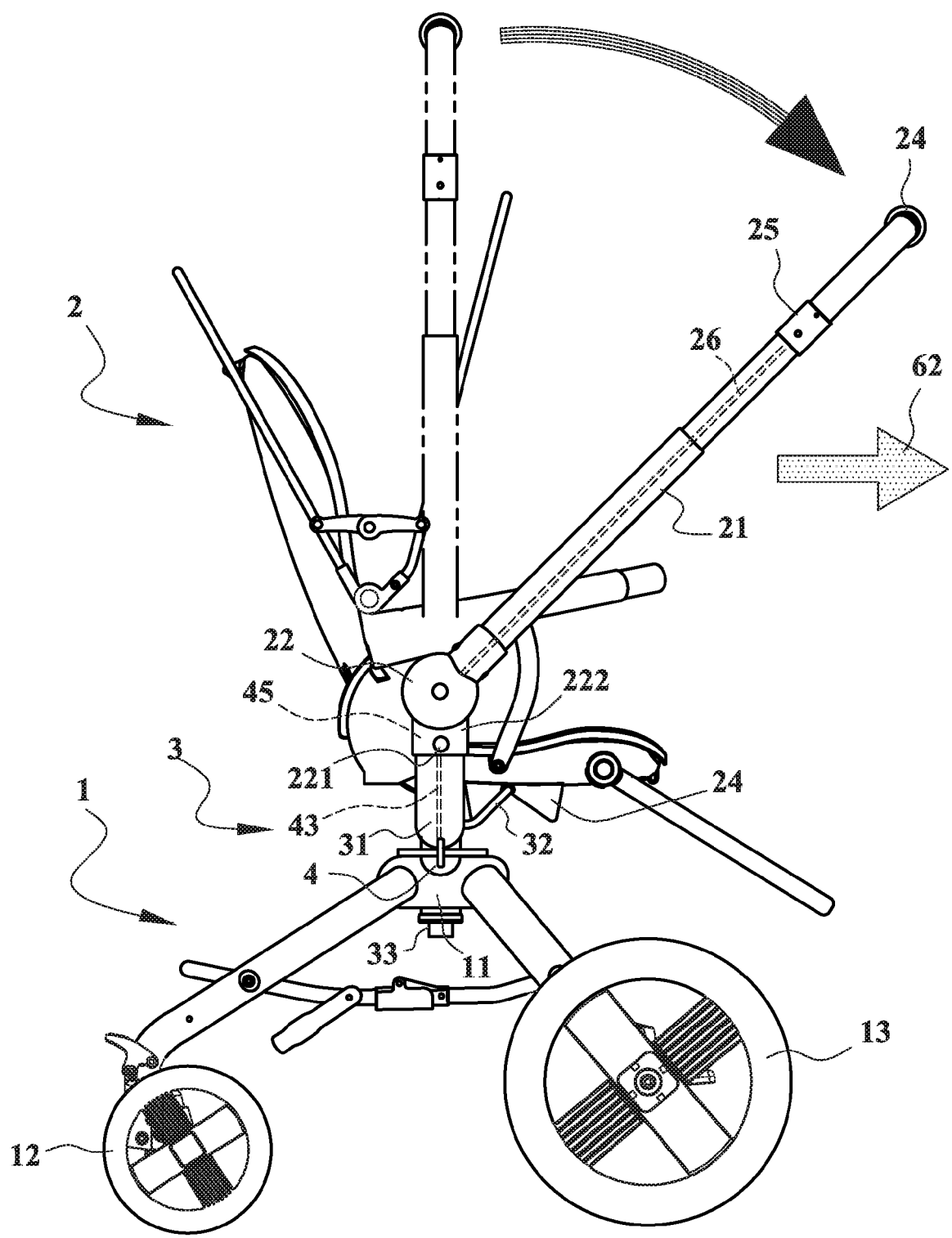
FIG. 11 is an illustrative side view illustrating a handle bar to be rotated from an upward position to a rearward position to lock the locking mechanism, so as to fix the swivelable seat in a selected direction.

Referring to FIGS. 10 and 11, a care giver or stroller user can change the direction of the swivelable seat 2 by rotating the push bars 21 to the upright position and thereafter to change the swivelable seat 2 from first direction 7 (designated by arrow 61) to second direction (designated by arrow 62), and then to fix the handle bar 21 on the side near the rear wheel 12, so as to accommodate the baby facing to the care giver.

Figure 12:
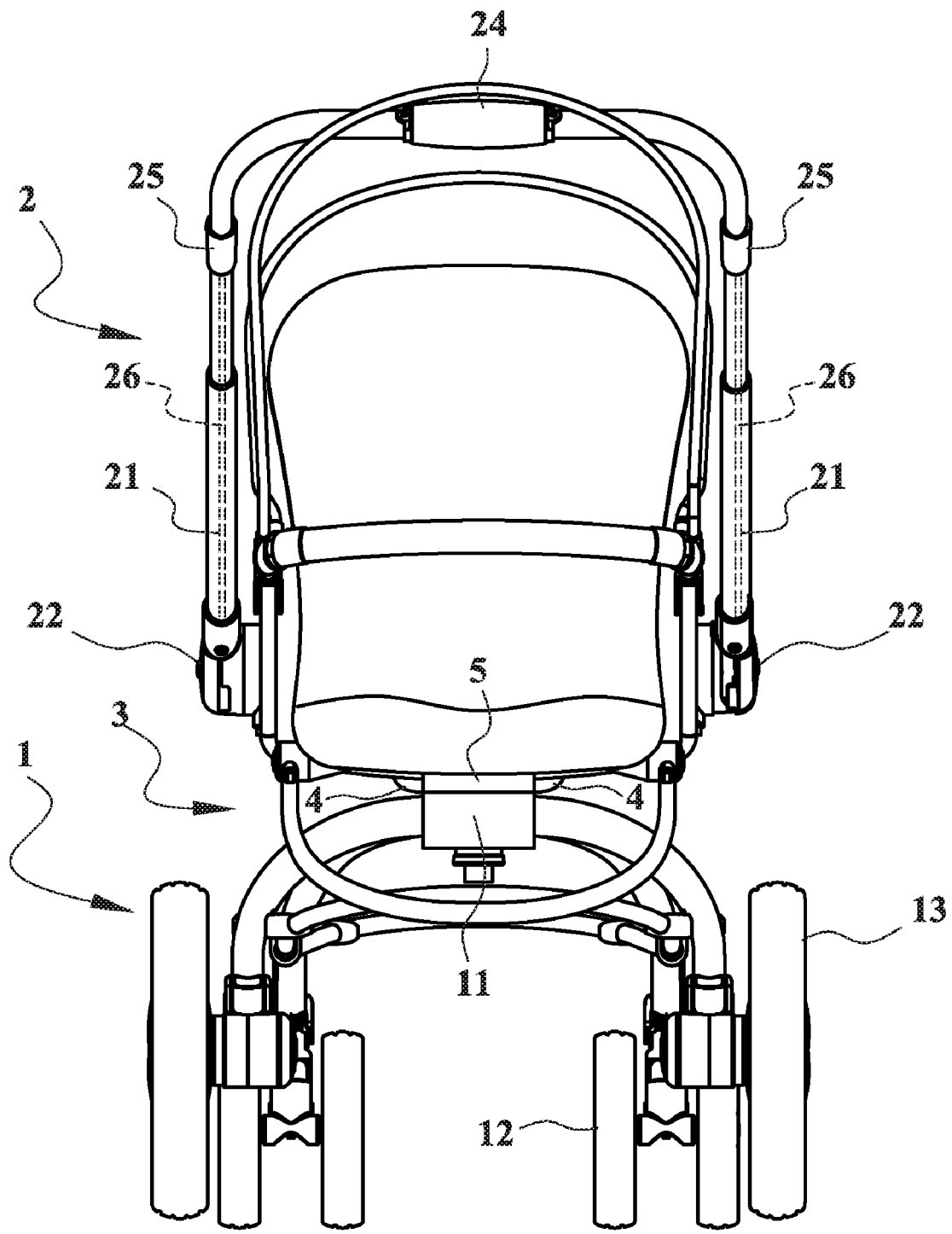
FIG. 12 is an elevation front view for schematically illustrating an alternative embodiment of the swivel connector connected between the swivelable seat and the collapsible wheeled frame according to the present invention.
Figure 13:
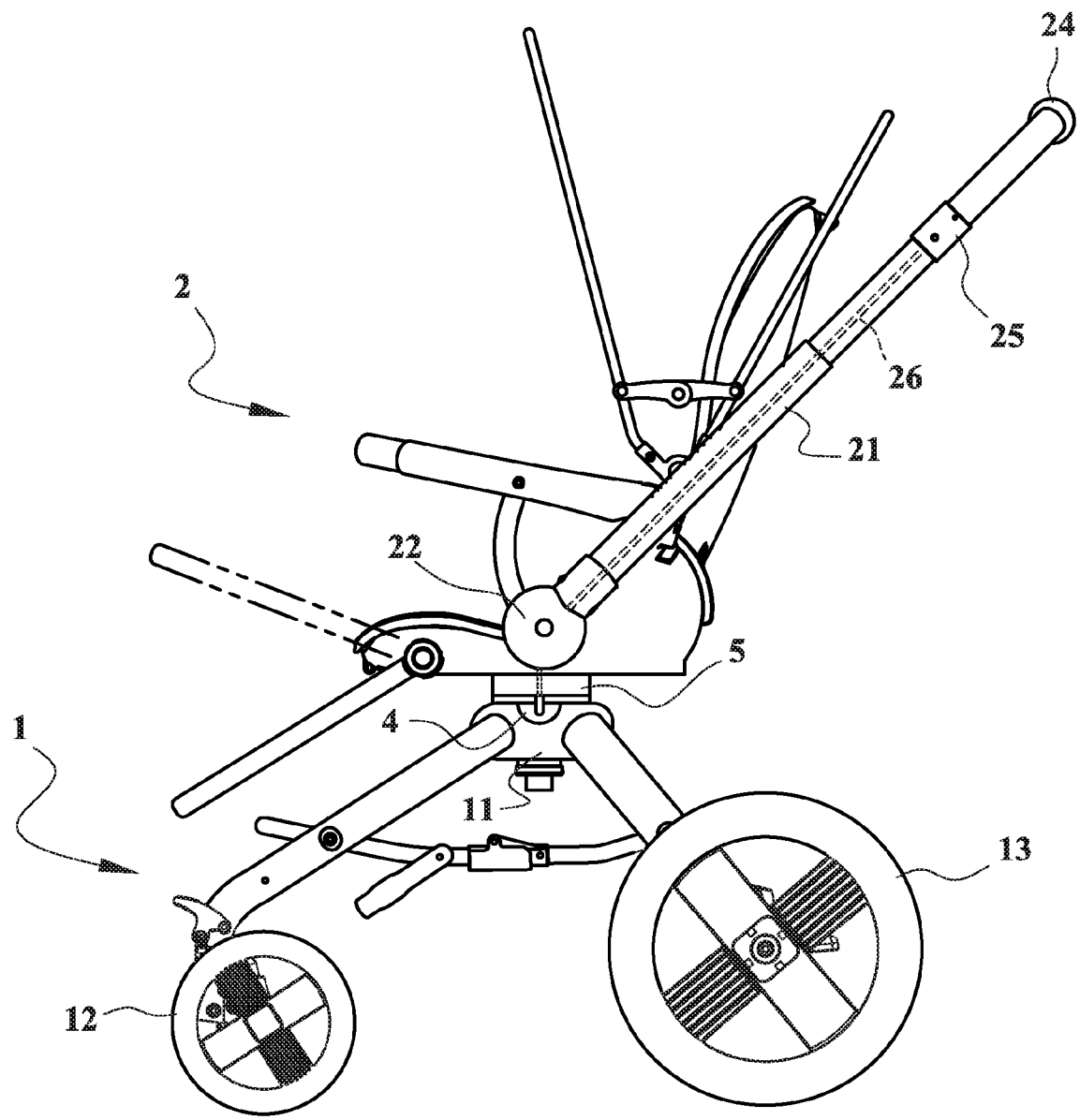
FIG. 13 is an elevation side view illustrating the alternative embodiment of FIG. 12.

FIGS. 12 and 13 show another embodiment of the swivelable connector 5 of the stroller frame in accordance with the present invention. The swivelable connector 5 may be a base mounted under the swivelable seat 2 and pivotably engaged with the swivel mount 11. The locking mechanism 4 connected on either sides of the swivelable connector 5 for engaging with the swiveling mount 11.

While the invention has been described with reference to the structures disclosed herein, it is not confined to the details set forth and this application is intended to cover such modifications or changes as may come within the purposes of the improvements or the scope of the following claims.

What is claimed is:

1. A baby stroller frame with a swivelable seat, comprising:
   a collapsible wheeled frame, having a swiveling mount on the top thereof formed with at least two locking positions;
   a swivelable connector pivotably connected with the swiveling mount, having at least a locking mechanism for selectively engaging with one of the locking positions, and a driving mechanism associated with the locking mechanism; and
   a swivelable seat connected with the swivelable connector, having a pair of push bars for actuating the driving mechanism thereby to unlock the locking mechanism, so as to permit the swivelable seat to change its direction.

2. A baby stroller frame with a swivelable seat according to claim 1, wherein the pair of push bars are pivotably connected on the swivelable seat through a pair of lockable swivel bases which can be used to lock the push bars in a forward position, a rearward position and an upright position.

3. A baby stroller frame with a swivelable seat according to claim 2, wherein the driving mechanism is actuated by rotating the push bars to the upright position.

4. A baby stroller frame with a swivelable seat according to claim 2, wherein the lockable swivel bases each has a cam member driven by the push bars for actuating the driving mechanism.

5. A baby stroller frame with a swivelable seat according to claim 4, wherein the driving mechanism comprises a spring biased slider for slidably abutting on the cam member and associating with the driving mechanism through a second connecting member.

6. A baby stroller frame with a swivelable seat according to claim 5, wherein the spring biased slider is connected with the second connecting member through a lever pivoted on the swivelable connector.

7. A baby stroller frame with a swivelable seat according to claim 5, wherein the second connecting member is guided by a pulley mounted in the swivelable connector.

8. A baby stroller frame with a swivelable seat according to claim 1, wherein the driving mechanism is associated with the locking mechanism through a second connecting member.

9. A baby stroller frame with a swivelable seat according to claim 8, wherein the spring biased slider is connected with the second connecting member through a lever pivoted on the swivelable connector.

10. A baby stroller frame with a swivelable seat according to claim 8, wherein the second connecting member is guided by a pulley mounted in the swivelable connector.

11. A baby stroller frame with a swivelable seat according to claim 1, wherein the swivelable connector has a pair of arms for connecting with the swivelable seat, and an axle extended downwardly for pivotally connecting to the swiveling mount.

12. A baby stroller frame with a swivelable seat according to claim 11, wherein the swivelable seat is formed with a pair of receptacles for detachably connected with the arms, and the swivelable connector comprises a spring biased button for engaging with the receptacles.

13. A baby stroller frame with a swivelable seat according to claim 1, wherein the locking mechanism comprises a spring biased latch and a slider guider for slidably receiving the spring biased latch.

14. A baby stroller frame with a swivelable seat according to claim 13, wherein the spring biased latch has a locked position for engaging with the swiveling mount, and an unlocked position for disengaging from the swiveling mount.

15. A baby stroller frame with a swivelable seat according to claim 13, wherein the spring biased latch is connected with the driving mechanism through a second connecting member, and can be pulled by the second connecting member to disengage from the swiveling mount.

16. A baby stroller frame with a swivelable seat according to claim 13, wherein the spring biased slider is connected with the second connecting member through a lever pivoted on the swivelable connector.

17. A baby stroller frame with a swivelable seat according to claim 13, wherein the second connecting member is guided by a pulley mounted in the swivelable connector.

* * * * *